May 11, 1926.
C. H. CLARK
1,584,568
BICYCLE AND THE LIKE
Filed Feb. 17, 1922   2 Sheets-Sheet 1
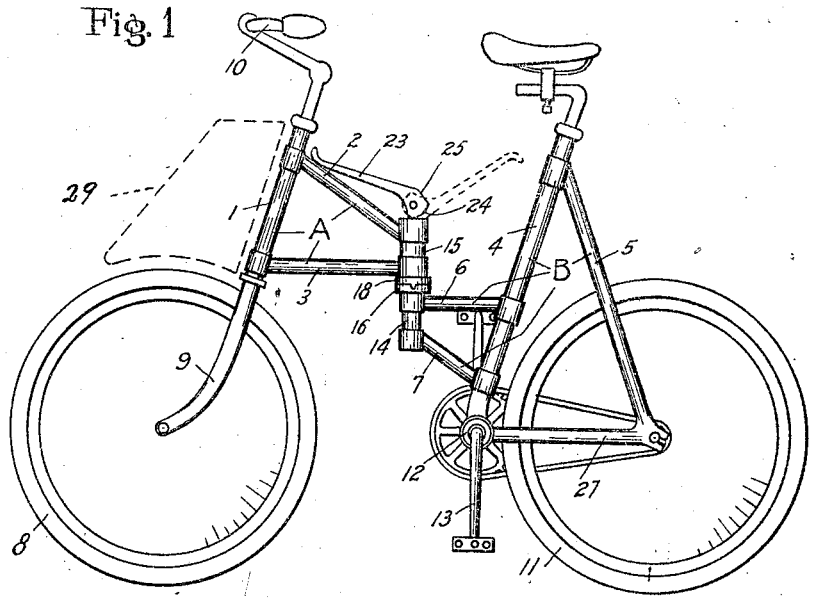
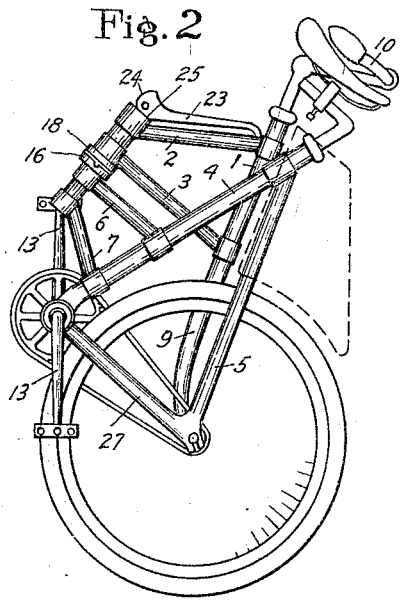
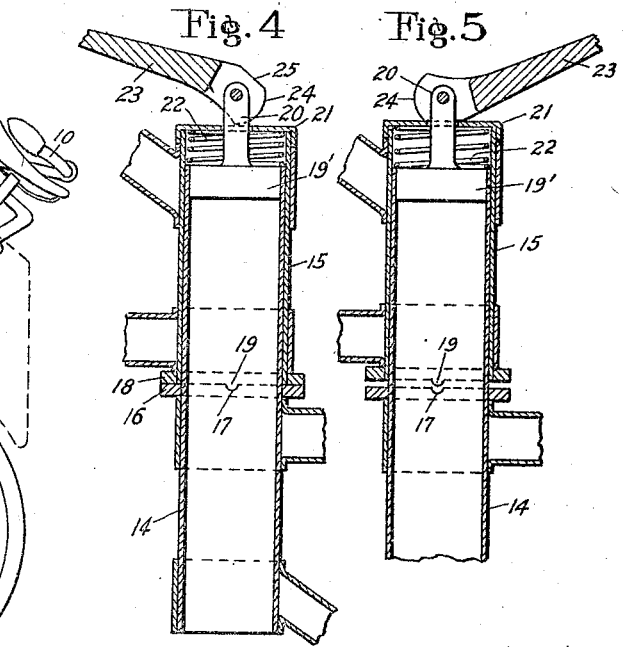
Inventor
Charles H. Clark
By his Attorney
Wm Rohleber May 11, 1926.
C. H. CLARK
BICYCLE AND THE LIKE
Filed Feb. 17, 1922
1,584,568
2 Sheets-Sheet 2
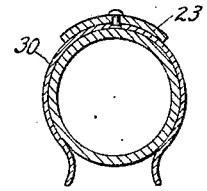
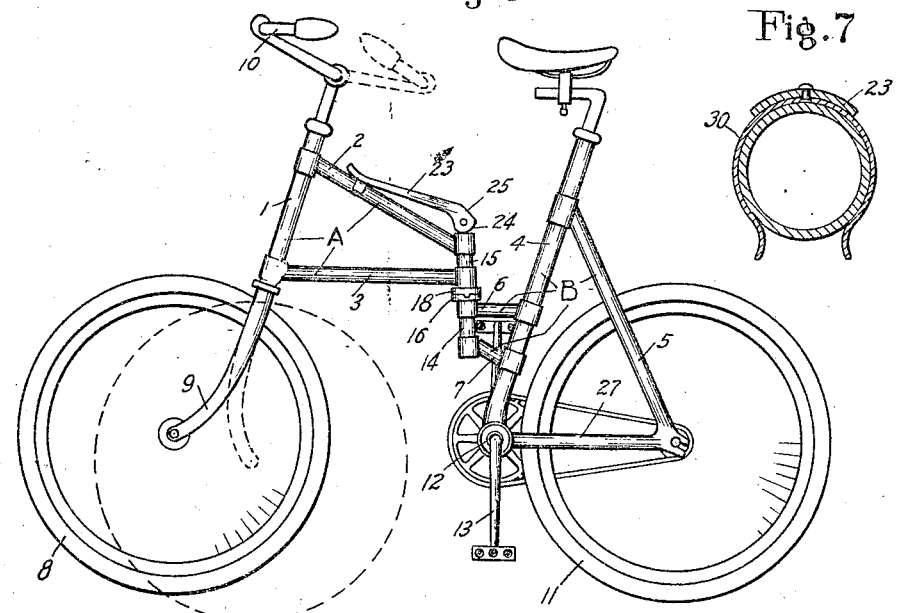
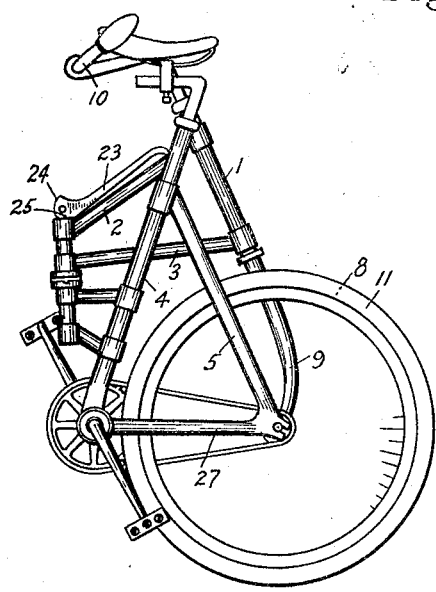
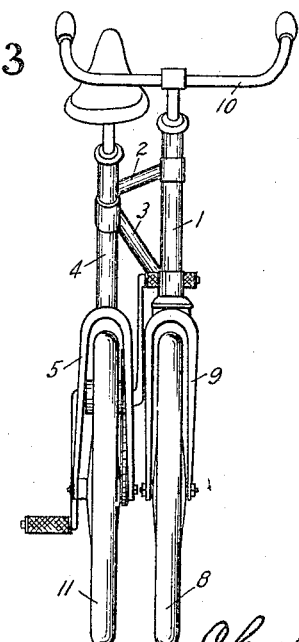
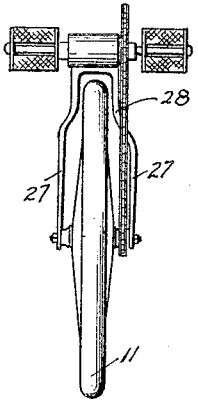
Inventor
Charles H. Clark
By his Attorney
Wm Pohleber Patented May 11, 1926.

1,584,568

UNITED STATES PATENT OFFICE.

CHARLES HASKELL CLARK, OF NEW YORK, N. Y.

BICYCLE AND THE LIKE.

Application filed February 17, 1922. Serial No. 537,180.

The invention which constitutes the subject matter of this application relates to an improvement in bicycles and motorcycles, one of the more important objects of which is to so construct such a device as to enable it to be folded up into very compact form thus making it readily portable.

Further objects, advantages, and features of construction and operation will be understood from the detailed description below taken in connection with the accompanying drawings in which Figure 1 is a side view of the improved bicycle showing the parts in normally operative positions.

Figure 2 illustrates a side view of the device in folded position.

Figure 3 is a rear end view of the bicycle in folded position.

Figures 4 and 5 illustrate one form of mechanism employed for connecting the front and rear frames A and B to each other said connection enabling the front frame and wheel to be folded upon the rear frame and wheel.

Figures 6 and 7 are detail views,

Figures 8 and 9 illustrate a slightly modified form of the invention.

Referring to the drawings in detail the reference letters A and B designate respectively the front and rear frames the former comprising the steering head 1 and arms 2 and 3, and the latter comprising the tube 4, angular members 5 and arms 6 and 7. The front wheel 8 is mounted in a fork 9 in the usual manner, said fork being journaled in the steering head 1 of the frame A and provided with the usual handle bars 10. The rear wheel 11 is connected to the angular members 5 of the frame B in the usual manner but the construction of said frame B is such that the hanger 12, and therefore the pedal cranks 13, is mounted very close to the periphery of the wheel 11 thus enabling the wheel base to be materially shortened so that, when the front and rear frames are folded one upon the other the bicycle assumes a more compact form.

A stem 14 is suitably but rigidly connected to the arms 6 and 7 of the frame B. This stem extends upwardly from the arms 6 and 7 and on it is journalled a sleeve 15. Just above the arm 6 on stem 14 is secured a lock washer 16 having an axially directed groove 17. Also secured to and preferably flush with the lower end of sleeve 15 is a companion lock washer 18 having a key 19 which fits into the groove 17. The sleeve 15 is fastened to the steering head 1 by means of the arms 2 and 3 of frame A. It will be noted that sleeve 15 with its lock washer 18 normally rests upon the lock washer 16. And it may also be pointed out that the sleeve 15 with its lock washer 18 is adapted to be moved upwardly and downwardly on the stem 14 to enable the frames A and B to be folded upon each other. The mechanism for effecting a relative rotatable or pivoted movement of the sleeve 15 and stem 14 is as follows: The stem 14 is preferably hollow so as to be conducive to lightness. Therefore a block 19' is secured in the upper end thereof which block is provided with stud 20 which extends through the cap 21 suitably fastened to the upper end of the sleeve 15, an expansion spring 22 being interposed between the cap 21 and the upper end of the stem 14. This spring always tends to move the sleeve 15 upwardly relative to the stem 14 to disengage the washers 16 and 18 from interlocking engagement with one another. On the stud 20 is journalled an eccentric bifurcated lever or arm 23 provided with two surfaces 24 and 25 a point on the former bearing upon the cap 21 when the lever 23 is in the position illustrated in Fig. 4 and the latter bearing upon the cap 21 when the lever 23 is in the position illustrated in Fig. 5, the whole object of which, from the foregoing, is self-evident. It may be stated however that when the lever 23 is in the position indicated in Fig. 4 and in full lines in Fig. 1 the front and rear frames A and B are locked against relative rotary motion but when in the position illustrated in Fig. 5 and in dotted lines in Fig. 1 the springs 22 disengages the lock washer 18 from its companion washer 16 thus enabling the frame A and B to be folded one upon the other, as clearly illustrated in Figures 2 and 3. The employment of the spring 22 enables the lock washers to separate automatically from each other upon the movement of the lever 23 from the full to the dotted line position indicated in Fig. 1.

To make the wheel base as short as possible I have provided a construction of frame as a whole in which the sprocket wheel 24 overlaps the rear wheel as clearly indicated. To accomplish this the arm 27 of the angular member 5 is offset inwardly as indicated at 28 in Fig. 6. This makes it possible to shorten the wheel base without danger of the rider's feet striking the rear of the front wheel during revolutions of the pedal.

From the foregoing it will be seen that I have devised a construction of a bicycle which can be folded into very compact form. It will of course be understood that the axis of the stem 14 is such that when the front and rear frames A and B are folded upon each other the front and rear wheels are located side by side. If it is desired to have either wheel lower than the other in folded position it is only necessary to incline the axis of the stem 14 forwardly or backwardly. Any suitable means may be employed for holding the frames and wheels in folded position. It will be readily apparent that the frames A and B constitute the framework of the bicycle.

The arms 6 and 7 to which the stem 14 is secured are located in close proximity to the hanger and constitute the only connection of the rear frame B with the front frame A, thus enabling the bicycle to be used by a woman as well as a man. To enable the bicycle to be used as a motor cycle it is only necessary to substitute for the front wheel a standard form of motor wheel such for instance as the Smith type. In this case the gasoline tank can either be mounted on the front wheel or on the steering head as indicated at 29. I have illustrated the tank 29 in Figs. 1 and 2 as being so designed that it occupies no additional space when the frames are folded upon each other.

In Figures 8 and 9 I have illustrated a slightly modified form of the invention in which the front wheel is given a half revolution before folding as clearly illustrated in dotted lines.

I have illustrated and described herein what I consider to be the preferred embodiments of my invention but it is to be expressly understood that I do not limit myself thereto as many changes may be made in point of detail and other embodiments resorted to without deviating from the true spirit and scope of my invention.

What I claim is:

1. A bicycle or similar device comprising a rear frame to which the rear wheel is connected in the usual way, an upwardly projecting coupling stem rigidly connected to said frame, a front frame to which the front wheel is connected and provided with a sleeve pivotally mounted upon the upper end of said upwardly projecting portion of the stem, and means cooperating with said stem and sleeve for effecting an interlocking engagement between the same.

2. A bicycle or similar device comprising a rear frame to which the rear wheel is connected in the usual way, an upwardly projecting coupling stem rigidly connected to said frame, a front frame to which the front wheel is connected and provided with a sleeve rigidly connected thereto and pivotally mounted upon the upper end of said upwardly projecting portion of said stem, interlocking means on said stem and sleeve, and manually actuated means on said stem and co-operating with said sleeve for effecting a relative movement of said stem and sleeve for causing an engagement and disengagement of said interlocking means.

3. In a bicycle or similar device, a front frame including a steering head to which the front wheel is connected, and a rear frame including a member upon which the seat is supported and to which the rear wheel is connected, in combination with means for pivotally connecting said frames to each other comprising arms rigidly connected to and projecting rearwardly from said steering head, the rearward ends of said arms being connected to each other by means of a sleeve, arms rigidly connected to and projecting forwardly from said seat supporting member, the forward ends of said arms being connected to each other by means of a second sleeve, and means connecting said sleeves said rearwardly and forwardly projecting arms being pivotally connected to each other about an axis coinciding with the axis of said sleeves to enable the frames to be folded upon each other.

4. In a bicycle or similar device, a front frame including a steering head to which the front wheel is connected, and a rear frame including a member upon which a seat is supported and to which the rear wheel is connected, in combination with means for pivotally connecting said frames to each other comprising arms projecting rearwardly from the steering head and also arms projecting forwardly from the seat supporting member, and relatively movable interlocking means pivotally connecting the projecting ends of said arms about a common axis with the ends of the forwardly projecting arms located below the ends of the rearwardly projecting arms to accommodate the skirts of a lady.

5. In a bicycle or similar device, a front frame including a steering head to which the front wheel is connected, and a rear frame including a member upon which the seat is supported and to which the rear wheel is connected, in combination with means for pivotally connecting said frames to each other comprising arms rigidly connected to and projecting rearwardly from said steering head, the rearward ends of said arms being connected to each other by means of a sleeve, arms rigidly connected to and projecting forwardly from said seat supporting member, the forward ends of said arms being connected to each other by means of a second sleeve which telescopes with and is pivotally connected to the first mentioned sleeve, and means for locking said sleeves against relative rotation.

6. In a bicycle or similar device a front frame including a steering head to which the front wheel is connected and a rear frame including a member upon which the seat is supported and to which the rear wheel is connected, in combination with mechanism for pivotally connecting said frames to each other, comprising a plurality of arms extending rearwardly from the steering head, a plurality of arms extending forwardly from the seat supporting member, means for effecting a rigid connection between the ends of the forwardly projecting arms, means for effecting a rigid connection between the ends of the rearwardly projecting arms, and means for securing the aforesaid means to each other to rotate relatively about the same axis.

7. In a bicycle or similar device, a front frame including a steering head to which the front wheel is connected and a rear frame to which the rear wheel is connected, in combination with pivot means located in the plane of said frames for connecting the same to each other whereby the front frame and front wheel are foldable in either direction upon the rear frame and rear wheel, and manually operated means connected to said pivot means for effecting a relative movement of said front and rear frames to lock the same in operative position.

8. In a bicycle or similar device, a front frame including a steering head to which the front wheel is connected, and a rear frame including a member upon which the seat is supported and to which the rear wheel is connected, in combination with means of pivotally connecting said frames to each other comprising arms connected to and projecting rearwardly from said steering head, the rearward ends of said arms being connected to each other by means of a sleeve, arms rigidly connected to and projecting forwardly from said seat supporting member, the forward ends of said arms being connected to each other by means of a second sleeve, said rearwardly and forwardly projecting arms being pivotally connected to each other about an axis coinciding with the axis of said sleeves to enable the frames to be folded one upon the other, and means on said sleeves for interlocking the latter in operative position.

9. In a bicycle or similar device, a front frame including a steering head to which the front wheel is connected, and a rear frame including a member upon which the seat is supported and to which the rear wheel is connected, in combination with means normally in a plane of said frames for pivotally connecting the latter to each other comprising arms extending rearwardly and forwardly respectively from the steering head and seat supporting member, the projecting ends of said forwardly projecting arms being pivoted about a common axis with the ends of said rearwardly projecting arms, and manually actuated means on said pivoted connecting means for effecting a relative movement of the front and rear frames to lock the same in normal position.

10. In a bicycle or similar device, a front frame including a steering head to which the front wheel is connected and a rear frame including a means upon which the seat is supported and to which the rear wheel is connected, in combination with means of pivotally connecting said frames to each other comprising a member to which the front frame is connected, and a second member to which the rear frame is connected, said members being pivotally connected to each other to enable the frames to be folded one upon the other, and means on said members for a relative movement of the frames to lock the same in operative position.

In testimony whereof I affix my signature.

CHARLES HASKELL CLARK.